(No Model.)

H. L. WOOD.
NUT AND BOLT LOCK.

No. 538,309. Patented Apr. 30, 1895.

Witnesses:
James R. Steers
Anthony Ernest

Inventor:
Horace L. Wood

THE NORRIS PETERS CO., PHOTO-LITHO., WASHINGTON, D. C.

UNITED STATES PATENT OFFICE.

HORACE L. WOOD, OF NEW YORK, N. Y.

NUT AND BOLT LOCK.

SPECIFICATION forming part of Letters Patent No. 538,309, dated April 30, 1895.

Application filed March 28, 1894. Serial No. 505,407. (No model.)

*To all whom it may concern:*

Be it known that I, HORACE L. WOOD, a citizen of the United States, residing in the city, county, and State of New York, have invented a certain new and useful Improvement in Bolt and Nut Locks, of which the following is a specification.

My invention relates to improvements in bolt and nut locks, and has for its object the safety and security of bolts and nuts, whereby the same are prevented from turning or becoming loose, and consists in the construction and novel combination which is illustrated by the accompanying drawings.

Figure 1:
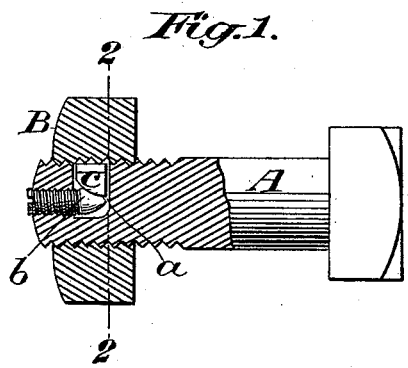
Figure 2:
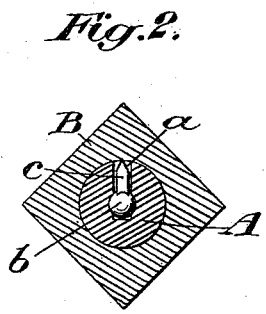
Figure 3:
Figure 4:
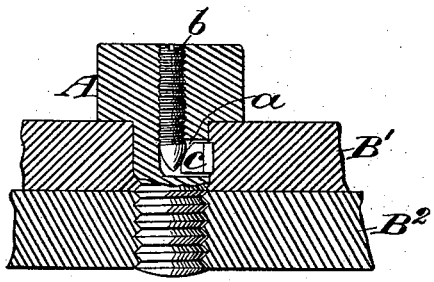

Figure 1 represents a longitudinal view, partly in section, of a bolt and a nut embodying my invention. Fig. 2 is a transverse section in the line 2, 2, of Fig. 1. Fig. 3 is a perspective view of the dog which constitutes an essential feature of my invention. Fig. 4 represents a sectional view illustrating the application of my invention to a screw bolt without a nut.

For a further detailed description, A, in Fig. 1, designates a plain threaded bolt partly in section, having a transverse slot $a$, partly through its threaded portion so as to receive the dog C, inserted thereinto, also having a cone-pointed screw $b$, screwed longitudinally into the threaded portion of the bore of the bolt and into the said slot and against the said dog, thus forcing the same outward and against the nut B, on said bolt; also A (in Fig. 4) designates the bolt without a nut.

B designates the nut on the, bolt A.

B' and B², as shown in Fig. 4 designate two iron plates screwed together by the threaded bolt A, also showing the cone-pointed screw $b$, screwed into the threaded bore of the bolt and against the dog C, in slot $a$, in said bolt thus forcing the same outwardly and against said iron plate and thus locking the bolt.

The dog C, designated in Figs. 1, 2, 3, and 4 and more particularly shown in Fig. 3, has a groove on the curved portion thereof where the cone-point of said screw engages the same in forcing it outwardly when the same is in position in the slot of the bolt and has a sharp beveled edge, so that when in position and sufficiently forced outwardly and against the threads of the nut or plate, as the case may be, it holds firmly the nut or bolt and thus prevents the same from turning or becoming loose.

To unlock the bolt or nut, simply turn the cone pointed screw backward two or three turns.

What I claim as my invention, and desire to secure by Letters Patent, is—

1. The combination with a screw bolt having in one end a screw-threaded bore and having a transverse slot communicating with said bore, of a dog arranged in said slot and a cone-pointed screw screwing into said bore to press against the said dog for the purpose of forcing it outward, substantially as herein set forth.

2. The combination with a nut, of a screw bolt having in one end a screw-threaded bore and having within the range of the nut a transverse slot communicating with said bore, a dog arranged in said slot and a cone-pointed screw screwing into said bore for the purpose of forcing the said dog outward into engagement with the nut, substantially as herein set forth.

This specification signed and witnessed this 27th day of March, 1894.

HORACE L. WOOD.

Witnesses:
JAMES R. STEERS, Jr.,
ANTHONY J. ERNEST.